United States Patent
Spears et al.

(10) Patent No.: US 11,473,694 B1
(45) Date of Patent: Oct. 18, 2022

(54) VALVE OPERATOR ASSEMBLY

(71) Applicant: Spears Manufacturing Co., Sylmar, CA (US)

(72) Inventors: Wayne Spears, Ketchikan, AK (US); David Glover, Agua Dulce, CA (US); Douglas Swingley, Agua Dulce, CA (US)

(73) Assignee: Spears Manufacturing Co., Sylmar, CA (US)

( * ) Notice: Subject to any disclaimer, the term of this patent is extended or adjusted under 35 U.S.C. 154(b) by 0 days.

(21) Appl. No.: 17/465,667

(22) Filed: Sep. 2, 2021

Related U.S. Application Data (63) Continuation of application No. 17/321,062, filed on May 14, 2021, now Pat. No. 11,149,874.

(51) Int. Cl.
*F16K 31/50* (2006.01)
*F16K 31/60* (2006.01)

(52) U.S. Cl.
CPC ............ *F16K 31/508* (2013.01); *F16K 31/60* (2013.01)

(58) Field of Classification Search
CPC ............................... F16K 31/60; F16K 31/508
See application file for complete search history.

(56) References Cited

U.S. PATENT DOCUMENTS

| | | | |
|---|---|---|---|
| 2,908,182 A | 10/1959 | Ray | |
| 2,909,079 A | 10/1959 | Fawkes | |
| 3,063,298 A | 11/1962 | Elliott | |
| 3,677,108 A | 7/1972 | Prikryl et al. | |
| 3,701,362 A | 10/1972 | Reese | |
| 3,877,677 A | 4/1975 | Daghe et al. | |
| 3,929,024 A | 12/1975 | Sheesley et al. | |
| 4,023,432 A | 5/1977 | Killian | |
| 4,075,898 A | 2/1978 | Carlson | |
| 6,010,115 A | 1/2000 | Schlegel et al. | |
| 7,303,180 B1 | 12/2007 | O'Shea | |
| 7,798,431 B2 | 9/2010 | Eader | |
| 2014/0332707 A1 | 11/2014 | Reilly | |

FOREIGN PATENT DOCUMENTS

| | | |
|---|---|---|
| CN | 203162310 U | 8/2013 |
| EP | 0244578 A2 | 11/1987 |
| GB | 2183010 A | 5/1987 |

(Continued)

OTHER PUBLICATIONS

Econ, Scotch Yoke Actuators, Spring Return, Double Acting Brochure, ERIKS Company, 2016, pp. 1-36.

(Continued)

*Primary Examiner* — Patrick C Williams
(74) *Attorney, Agent, or Firm* — Irell and Manella LLP (57) ABSTRACT

A valve operator assembly may include a housing, a yoke, and one or more stoppers. The housing is mountable on a valve, and includes a body having a sidewall including a shaft bore, to receive a shaft rotatable within the housing, and a cover having a top member mountable on a top portion of the body and a side portion extending downwards adjacent to and partially overlapping the sidewall. The yoke is operably coupled by a yoke nut to the shaft to impart rotation to a valve stem of the valve when the shaft is rotated. The one or more stoppers are disposed within the housing to restrict the linear motion of the yoke nut.

20 Claims, 7 Drawing Sheets

(56) References Cited

FOREIGN PATENT DOCUMENTS

JP          4070850 B2     4/1999

OTHER PUBLICATIONS

Rotork, GP and GH Range, Pneumatic and Hydraulic Actuators for Quarter-Turn Valves Brochure, pp. 1-12, issued Nov. 2020, Bath, United Kingdom.
Plasgear, Plastic Gear Operator Manual, Asahi/America, pp. 1-2.
Rotork, Group Products and Services, Innovative Flow Control and Asset Management Solutions Brochure, pp. 1-52, issued Nov. 2018, Bath, United Kingdom.
International Search Report and Written Opinion, International Patent Application serial No. PCT/US2021/032563, dated Aug. 31, 2021 (11 pages).
European Extended Search Report dated Aug. 25, 2022, European Application No. 21835148.4.

SECTION A-A

VALVE OPERATOR ASSEMBLY

PRIORITY CLAIM AND RELATED APPLICATIONS

This application is a Continuation of and claims priority under 35 U.S.C. § 120 to prior U.S. non-provisional patent application Ser. No. 17/321,062 entitled, "VALVE OPERATOR ASSEMBLY," filed May 14, 2021. This application is also related to co-pending international patent application no. PCT/US2021/032563 entitled, "VALVE OPERATOR ASSEMBLY," filed May 14, 2021. The aforementioned applications are expressly incorporated in their entirety herein by reference.

TECHNICAL FIELD

The present disclosure relates generally to the field of valves, and, more particularly, to valve operator assemblies.

BACKGROUND

A valve can be configured to regulate, direct, or control a flow of a fluid (for example, a gas or a liquid) by opening, closing, or partially obstructing a pathway through which the fluid flows. Valves have many uses, including agricultural applications such as controlling water for irrigation, industrial applications, and the like. A valve can be configured to couple to a valve operator (or actuator) mechanism that can be used to open, close, or partially open or close the valve.

SUMMARY

In one embodiment, a valve operator assembly is disclosed. The valve operator assembly may comprise a housing mountable on, or otherwise able to be connected to, a valve. The housing may include a body having a sidewall that may extend around a perimeter of the body and may include a shaft bore, to receive a shaft along a longitudinal axis of the body such that the shaft is rotatable within the housing, and a cover mountable on a top portion of the body, the cover having a top member with a side portion that may extend around a perimeter of the cover extending downwards so that it is adjacent to the sidewall, to at least partially overlap the sidewall, when the cover is mounted on the body. The valve operator assembly may further comprise a yoke disposed within the housing, directly or indirectly attachable to the valve (e.g., a stem of the valve), and operably coupled by a yoke nut to the shaft to impart rotation to the valve stem when the shaft is rotated. The yoke nut may include a yoke nut shaft bore to receive the shaft, and may be linearly movable upon rotation of the shaft, the linear motion of the yoke nut producing a rotational motion of the yoke. The valve operator assembly may further include one or more stoppers integral to, or disposed within, the housing to restrict the linear motion of the yoke nut.

In another embodiment, a valve operator assembly is disclosed. The valve operator assembly may comprise a housing mountable on, or otherwise able to be connected to, a valve. The housing may include a body having a sidewall that may extend around a perimeter of the body and may include shaft bores, to receive a shaft along a longitudinal axis of the body such that the shaft is rotatable within the housing, and a cover mountable on a top portion of the body, the cover having a top member with a side portion that may extend around a perimeter of the cover extending downwards so that it is adjacent to the sidewall, to at least partially overlap the sidewall, when the cover is mounted on the body. The body and the cover may be made of plastic material. The valve operator assembly may further comprise a yoke disposed within the housing, directly or indirectly attachable to the valve (e.g., a stem of the valve), and operably coupled by a yoke nut to the shaft to impart rotation to the valve stem when the shaft is rotated. The yoke nut may include a yoke nut shaft bore to receive the shaft, and may be linearly movable upon rotation of the shaft, the linear motion of the yoke nut producing a rotational motion of the yoke. The valve operator assembly may further comprise one or more stoppers integral to, or disposed within, the housing to restrict the linear motion of the yoke nut.

In yet another embodiment, a valve operator assembly is disclosed. The valve operator assembly may comprise a housing mountable on, or otherwise able to be connected to, a valve. The housing may include a body having a sidewall that may extend around a perimeter of the body and may include first and second shaft bores at first and second opposite sides, respectively, to receive a shaft along a longitudinal axis of the body such that the shaft is rotatable within the housing, and a cover mountable on a top portion of the body, the cover having a top member with a side portion that may extend around a perimeter of the cover extending downwards so that it is adjacent to the sidewall, to at least partially overlap the sidewall, when the cover is mounted on the body. The body and the cover may be made of plastic material. The valve operator assembly may further comprise a yoke disposed within the housing, directly or indirectly attachable to the valve (e.g., a stem of the valve), and operably coupled by a yoke nut to the shaft to impart rotation to the valve stem when the shaft is rotated. The yoke nut may include a third shaft bore to receive the shaft, and may be linearly movable upon rotation of the shaft such that the linear motion of the yoke nut produces a rotational motion of the yoke. The yoke and the yoke nut are operably coupled to each other by way of a yoke pin. The valve operator assembly may further comprise one or more stoppers integral to, or disposed within, the housing to restrict the linear motion of the yoke nut.

In some examples, the body and/or the cover are made of plastic material. The plastic material may be selected, for example, from one or more of: polyvinyl chloride; chlorinated polyvinyl chloride; polymethyl methacrylate; polycarbonate; polyethylene, including high density polyethylene and cross-linked polyethylene; polypropylene, polyethylene terephthalate, acrylonitrile-butadiene-styrene, poly vinylidene difluoride, ethylene chlorotrifluoroethylene, and/or the like.

In some examples, the side portion of the cover may not be continuous around a perimeter of the cover but may have one or more intermittent spaces or stretches where the side portion does not extend downwards so that it is adjacent to the sidewall In some examples, the yoke and the yoke nut are operably coupled to each other by way of a yoke pin.

In some examples, first and second stoppers are insertable into an interior of the housing through first and second stopper bores at first and second opposite sides of the sidewall, respectively.

In some examples, each of the first and second stopper is a screw having an externally threaded portion to engage with an internally threaded portion of each of the first and second stopper bore, respectively.

In some examples, the valve operator assembly further comprises first and second shaft retainers disposed inside the housing adjacent to first and second opposite sides of the sidewall, respectively, to retain the shaft in a fixed position.

In some examples, the shaft has a threaded outer surface to engage with a threaded inner surface of the yoke nut shaft bore.

In some examples, the valve operator assembly further comprises a handle operably coupled to the shaft to impart rotation to the shaft, upon rotation of the handle.

In some examples, the valve operator assembly further comprises a handle adapter operably coupled to the shaft by way of one or more handle pins, and operably coupled to the handle by way of an adapter nut.

In some examples, the handle is a handwheel.

In some examples, the housing is mountable on the valve by way of a plurality of mounting bolts and some examples include a corresponding plurality of mounting nuts.

In some examples, the valve operator assembly may further comprise an indicator positioned on the top member, and operably coupled to the yoke to indicate a current status of the valve (e.g., in the open position, in the closed position, or somewhere in between) based on a current angular position of the yoke.

Various embodiments of the present disclosure provide a valve operator assembly that includes a housing, a yoke, and first and second stoppers. The housing may be mountable on a valve, and may include a body having a sidewall that may extend around a perimeter of the body and may include shaft bores, to receive a shaft rotatable within the housing, and a cover mountable on a top portion of the body, the cover including a top member and a side member that may extend around a perimeter of the cover extending downwards so that it is adjacent to and at least partially overlapping the sidewall when the cover is mounted on the body. The body and the cover may be made of plastic material. The yoke may be operably coupled by a yoke nut to the shaft to impart rotation to a valve stem of the valve when the shaft is rotated. The yoke nut may have a yoke nut shaft bore to receive the shaft, and may be linearly movable upon rotation of the shaft to produce a rotational motion of the yoke. The first and second stoppers may be disposed within the housing to restrict the linear motion of the yoke nut.

Because the cover is mounted on the body such that the side portion or side member of the cover at least partially overlaps with the sidewall of the body, a structural integrity and strength of the housing is increased. In some embodiments, the housing is adaptable to handle high fluid pressure, e.g., to avoid bursting of the housing. Further, in some embodiments, stress on the housing is reduced and/or efficiently distributed as the first and second stoppers are utilized to restrict the linear motion of the yoke nut instead of using the sidewall of the housing to restrict the linear motion of the yoke nut. Because of this design, the body and the cover of the housing may be made from a lighter material, such as plastic material, without compromising a stability and/or strength of the housing. Additionally, in embodiments where the body and the cover are made from plastic material, a weight and a cost of the valve operator assembly may be reduced, the body and the cover may be molded into desired shapes, a corrosion resistance of the housing may be increased, and the valve operator assembly may be operational in a submerged environment (e.g., underwater).

BRIEF DESCRIPTION OF THE DRAWINGS

The illustrated embodiments of the subject matter will be best understood by reference to the drawings, wherein like parts are designated by like numerals throughout. The following description is intended only by way of example, and illustrates certain selected embodiments of devices, systems, and processes that are consistent with the subject matter as claimed herein.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figures 1, 2A:
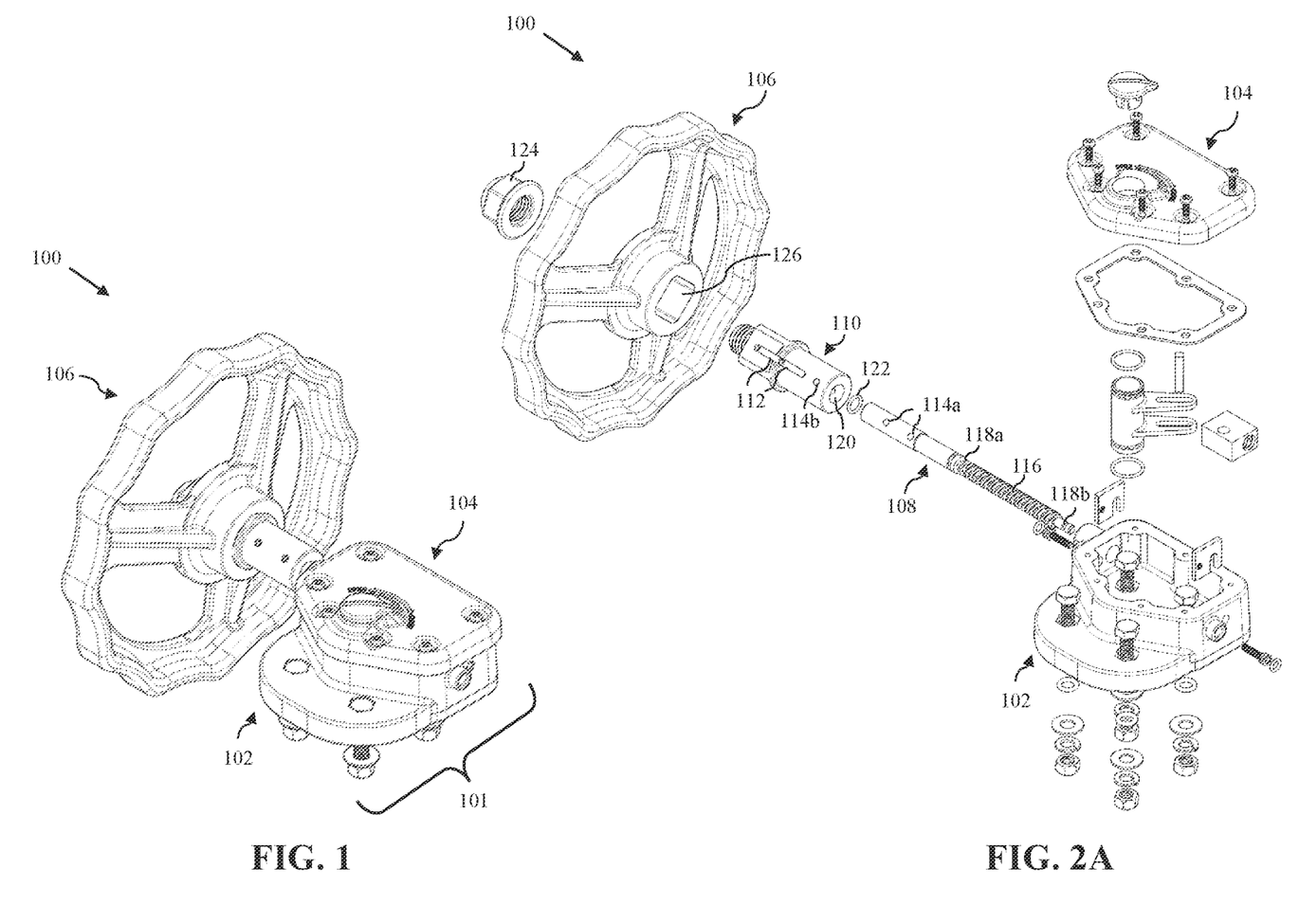
FIG. 1 is a perspective view of a valve operator assembly in accordance with an embodiment of the present disclosure.
FIG. 2A is an exploded perspective view of the valve operator assembly of FIG. 1 in accordance with an embodiment of the present disclosure.

FIG. 1 is a perspective view of a valve operator assembly 100 in accordance with an embodiment of the present disclosure. The valve operator assembly 100 is implemented to actuate, operate, control, or otherwise affect a valve (not shown). Some implementations of the disclosed valve operator assembly may be used in applications to control the flow of fluids under high pressure, for example, emergency fire sprinkler systems.

The valve operator assembly 100 includes a housing 101 comprising a body 102 and a cover 104 mountable on the valve, to operate the valve. In one embodiment, housing 101, including all or part of the body 102 and/or the cover 104, may be made of plastic material. The housing 101 comprising body 102 and cover 104 is hereinafter referred to simply as "housing." The plastic material may, for example, comprise one or more of: polyvinyl chloride (PVC), chlorinated polyvinyl chloride (CPVC), polymethyl methacrylate (PMMA), polycarbonate (PC), polyethylene (PE), high density polyethylene (HDPE), cross-linked polyethylene (PEX), polypropylene (PP), high density polypropylene (HDPP), polyethylene terephthalate (PET), poly vinylidene difluoride (PVDF), ethylene chlorotrifluoroethylene (ECTFE), and acrylonitrile-butadiene-styrene (ABS). In one example, the body 102 and the cover 104 are made of PVC.

The valve operator assembly 100 implements an operator mechanism, such as a manual, pneumatic, hydraulic, electric, or spring operator mechanism, to operate the valve. In one embodiment, the valve operator assembly 100 implements a manual operator mechanism to operate the valve. Examples of the valve include, but are not limited to, a ball valve, a butterfly valve, a choke valve, a diaphragm valve, a gate valve, a globe valve, a knife valve, a needle valve, a piston valve, a plug valve, a solenoid valve, and a spool valve. In one example, the valve is a 2-2½ inch butterfly valve.

The valve operator assembly 100 further includes a handle 106 to operate the valve. In one embodiment, the handle 106 is a handwheel, and when the handle 106 is rotated the valve is operated, e.g., to an opened, closed, or intermediate position. Thus, a rotational motion of the handle 106 is translated into an operation tending to open or close the valve. In one example, the handle 106 is made of high-density polypropylene (HDPP).

It will be apparent to a person skilled in the art that although in one embodiment, the body 102 and the cover 104 are made of plastic material and the handle 106 is made of HDPP, the scope of the present disclosure is not limited to it. In various other embodiments, the body 102, the cover 104, and/or the handle 106 may be made of one or more materials other than plastic and/or HDPP, such as metal, without deviating from the scope of the present disclosure.

FIG. 2A is a perspective exploded view of the valve operator assembly 100 in accordance with an embodiment of the present disclosure.

Referring now to FIGS. 1 and 2A together, the valve operator assembly 100 further includes a shaft 108 that connects the handle 106 and the housing 101, and acts as a translating member to translate the rotational motion of the shaft 108 into an operation tending to open or close the valve. The shaft 108 has a proximal end configured to be inserted in an interior of the housing 101 and a distal end operably coupled to a handle adapter 110, e.g., by way of one or more handle pins 112 insertable into handle pin bores 114a (provided at the distal end of the shaft 108) and handle pin bores 114b (provided at a proximal end of the handle adapter 110). The shaft 108 may include an externally threaded portion 116, and first and second grooves 118a and 118b at opposite ends of the externally threaded portion 116. Although the handle adapter 110 is shown to be operably coupled to the distal end of the shaft 108 by way of two handle pins, the scope of the present disclosure is not limited to such a coupling and other coupling mechanisms and/or any number of handle pins may be utilized in various other embodiments.

The handle adapter 110 has a shaft bore 120 at the proximal end thereof to receive the distal end of the shaft 108. Further, in one embodiment, a shaft o-ring 122 is positioned between the handle adapter 110 and the distal end of the shaft 108 to fill a space between the shaft 108 and the handle adapter 110. In one embodiment, the one or more handle pins 112 are made of metal, for example, stainless steel, and the shaft o-ring 122 is made of elastomer, for example, fluorocarbon based fluoroelastomers (FKM), ethylene propylene diene monomer (EPDM), nitrile rubber (BUNA), and/or the like. In another embodiment, one or more shaft o-rings 122 may be positioned in grooves on the shaft adjacent to shaft retainers 136a and 136b and/or grooves for holding those shaft retainers, as discussed further below.

The handle 106 is operably coupled to the shaft 108 by way of the handle adapter 110 to impart rotation to the shaft 108, upon rotation of the handle 106. The handle adapter 110 has an externally threaded portion to engage with an internally threaded portion of an adapter nut 124, such that the handle adapter 110 is insertable through an adapter bore 126 of the handle 106. In one embodiment, the handle adapter 110 and the adapter nut 124 are made of plastic material, such as PVC.

Figure 2B:
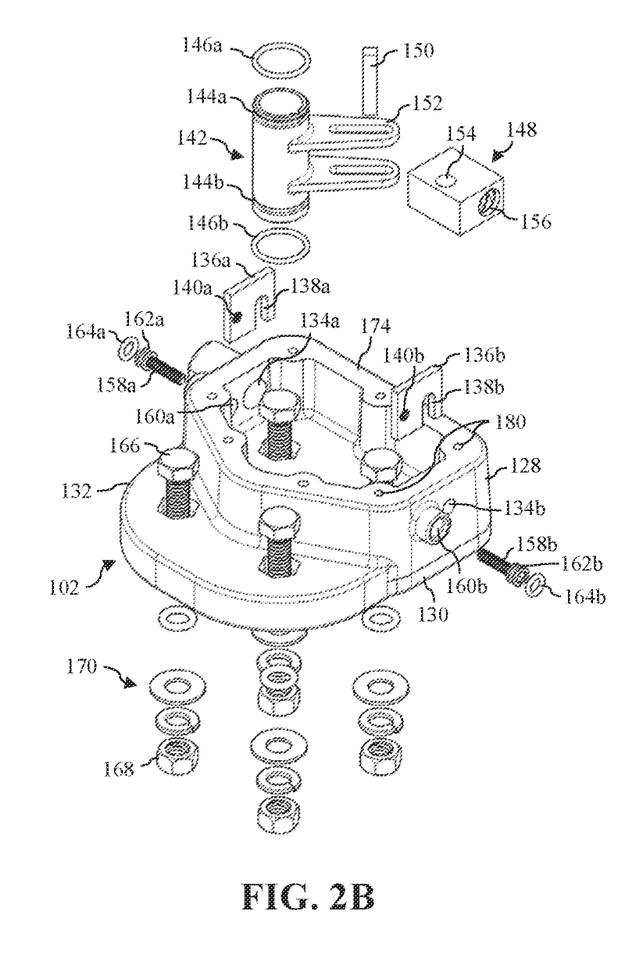
FIG. 2B is an exploded perspective view of a body and associated components of the valve operator assembly of FIG. 1 in accordance with an embodiment of the present disclosure.
Figure 2C:
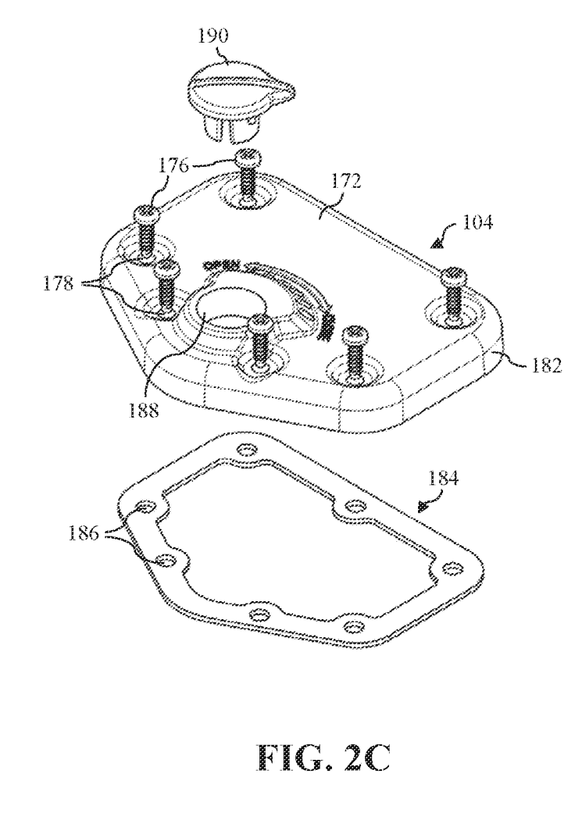
FIG. 2C is an exploded perspective view of a cover and associated components of the valve operator assembly of FIG. 1 in accordance with an embodiment of the present disclosure.

FIG. 2B is a perspective exploded view of the body 102 and associated components of the valve operator assembly 100 in accordance with an embodiment of the present disclosure. FIG. 2C is a perspective exploded view of the cover 104 and associated components of the valve operator assembly 100 in accordance with an embodiment of the present disclosure.

Referring now to FIGS. 2A, 2B, and 2C together, the body 102 has a sidewall 128, a bottom portion 130, and an extended shelf section 132.

The housing 101 may be mountable on the valve, e.g., by way of mounting bolts 166 and corresponding mounting nuts 168. The mounting bolts 166 have externally threaded portions to engage with internally threaded portions of the corresponding mounting nuts 168. In one embodiment, the mounting bolts 166 and the corresponding mounting nuts 168 are made of metal, for example, stainless steel. The mounting bolts 166 and the corresponding mounting nuts 168 include fastening members 170 in-between them, e.g., to strengthen a coupling between the housing 101 and the valve, when the housing 101 is mounted on the valve. In some implementations, the fastening members 170 may include lock washers, spring washers, flat washers, mounting bolt o-rings, and/or the like or combinations thereof that are positioned coaxially around respective mounting bolts. In one embodiment, one or more of the lock washers, spring washers, flat washers, and/or the like are made of metal, such as stainless steel, and the mounting bolt o-ring is made of elastomer, for example, fluoroelastomers (e.g., FKM, Viton, and/or the like), ethylene propylene diene monomer (EPDM) rubber, polybutadiene (e.g., Buna rubber), and/or the like.

The cover 104 has a top member 172 mountable on a top portion 174 of the body 102, e.g., by way of screws 176 that are insertable through screw holes 178 in the top member 172 and screw bores 180 in the top portion 174, to enclose the body 102 and form the housing 101. In one embodiment, the screws 176 are Plastite® screws and/or are made of metal, for example, stainless steel.

The cover 104 further includes a side portion 182 extending downwards so that it is adjacent to the sidewall 128, to at least partially overlap the sidewall 128, when the cover is mounted on the body. In some implementations, a gasket 184 may be positioned in between the cover 104 and the body 102, providing a mechanical seal that fills the space between the cover 104 and the body 102. The gasket 184 includes screw holes 186 through which the screws 176 are insertable, to mount the cover 104 on the body 102. In one embodiment, the gasket 184 is made of elastomer, for example, FKM, EPDM, BUNA, and/or the like.

Referring to FIG. 2B only, the sidewall 128 may include first and second shaft bores 134a and 134b at first and second opposite sides of the sidewall 128, to receive the shaft 108 along a longitudinal axis X (shown later in FIGS. 3 and 4) of the body 102. The proximal end of the shaft 108 is insertable through the first and second shaft bores 134a and 134b, and rotatable within the housing 101, e.g., within the body 102. In some implementations, only a first shaft bore 134a is provided to receive the shaft 108 into the body 102 of the housing 101.

The housing 101 further includes first and second shaft retainers 136a and 136b that are disposed adjacent to the first and second opposite sides of the sidewall 128, respectively, to retain the shaft 108 in a fixed position and restrict a linear motion of the shaft 108 along the longitudinal axis X. In one embodiment, the first and second shaft retainers 136a and 136b are thin rectangular plates that include first and second shaft slots 138a and 138b to engage with the first and second grooves 118a and 118b of the shaft 108, and first and second stopper holes 140a and 140b, respectively. In one embodiment, the shaft 108 and the first and second shaft retainers 136a and 136b are made of metal, for example, stainless steel. In some implementations, the shaft retainers are thick and have a non-rectangular geometry. In some implementations, the first and second shaft retainers may be connected by a plate or other member. In some implementations, a single shaft retainer may be used instead of first and second shaft retainers.

The valve operator assembly 100 further includes a yoke 142 that is disposed within the housing 101, and is directly or indirectly attachable to the valve, e.g., to a valve stem (not shown) of the valve. In some implementations, the bottom portion 130 of the body 102 may include a yoke bore (not shown) to receive the yoke 142. Further, the yoke 142 may have first and second grooves 144a and 144b at opposite ends of the yoke 142 around a circumference thereof, within which first and second yoke o-rings 146a and 146b are coaxially positioned, respectively. In one embodiment, the second yoke o-ring 146b is positioned between the yoke 142 and the yoke bore to form a seal between the yoke 142 and the body 102. In one embodiment, the first and second yoke o-rings 146a and 146b are made of elastomer, for example, FKM, EPDM, BUNA, and/or the like.

The yoke 142 may be operably coupled to a yoke nut 148 by way of a yoke pin 150. In one embodiment, the yoke 142 has one or more extending arms 152, and the yoke nut 148 has a yoke pin bore 154 to receive the yoke pin 150. In one embodiment, the yoke 142, the yoke nut 148, and/or the yoke pin 150 are made of metal. In one example, the yoke 142 and the yoke pin 150 are made of stainless steel, and the yoke nut 148 is made of bronze.

The yoke nut 148 may have a shaft bore 156 to receive the shaft 108, such that the externally threaded portion 116 of the shaft 108 engages with a threaded inner surface of the shaft bore 156.

Figure 3:
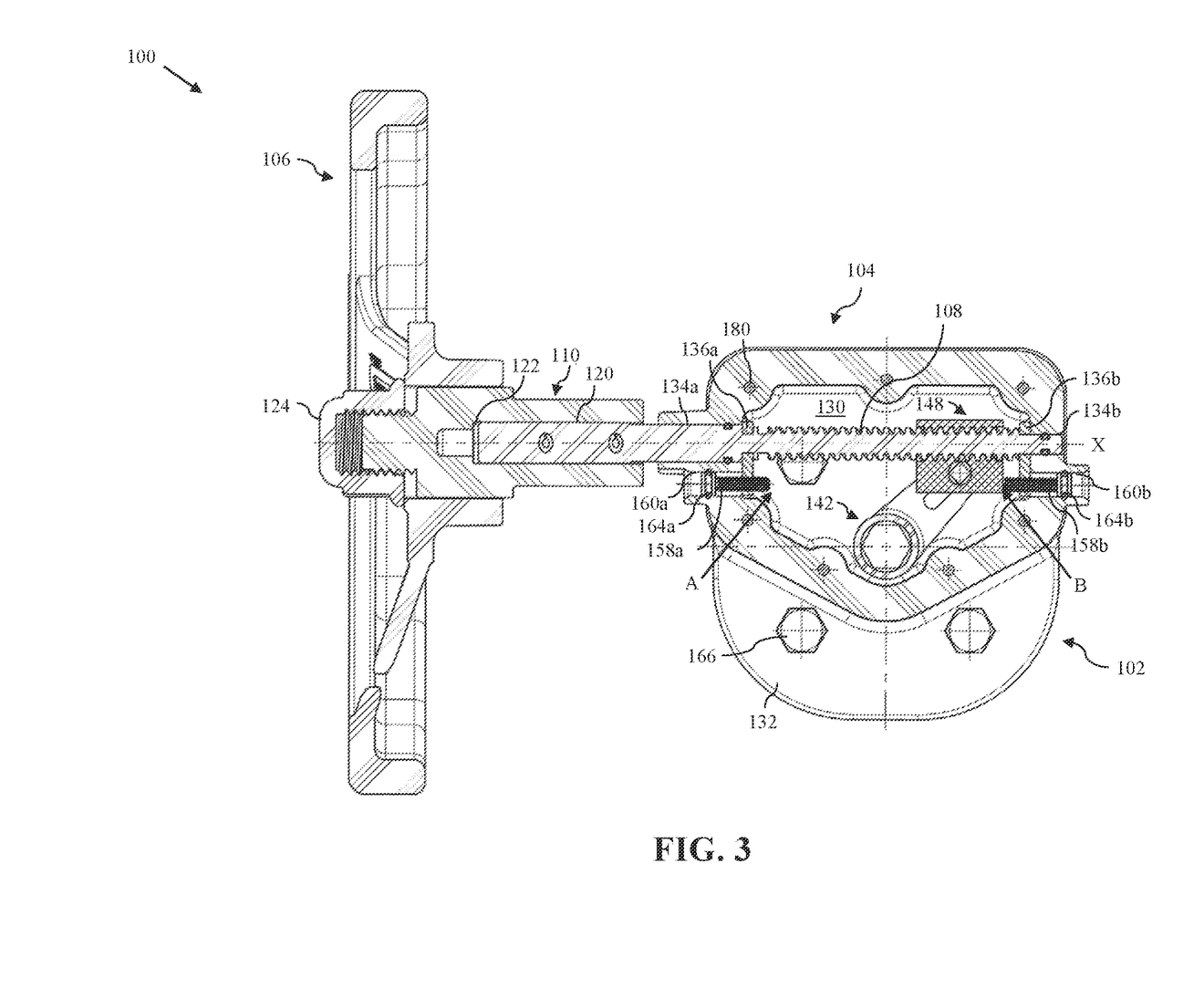
FIG. 3 is a cross-sectional top view of the valve operator assembly of FIG. 1 in accordance with an embodiment of the present disclosure.
Figure 4:
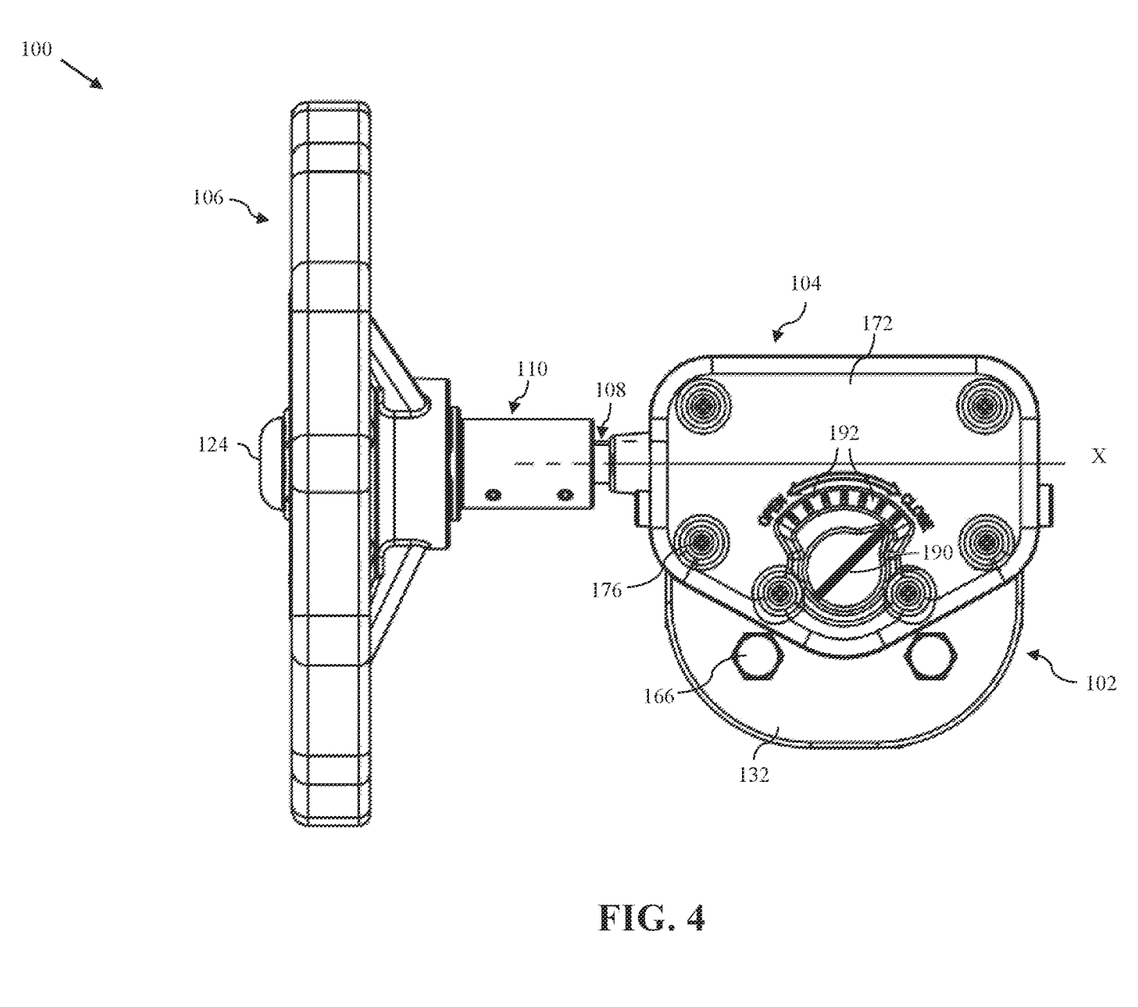
FIG. 4 is a top view of the valve operator assembly of FIG. 1 in accordance with an embodiment of the present disclosure.

FIG. 3 is a cross-sectional top view of the valve operator assembly 100 in accordance with an embodiment of the present disclosure. FIG. 4 is a top view of the valve operator assembly 100 in accordance with an embodiment of the present disclosure.

Referring to FIGS. 2B, 2C, 3, and 4 together, the yoke nut 148 is linearly movable, along the longitudinal axis X, upon rotation of the shaft 108. The yoke nut 148 is operably coupled to the yoke 142 such that the linear motion of the yoke nut 148 produces a rotational motion of the yoke 142 and actuates the valve by imparting rotation to the valve stem.

In operation, the valve (not shown) is actuated, e.g., by rotating the handle 106. When the handle 106 is rotated, the shaft 108 rotates resulting in the linear motion of the yoke nut 148. In one example, when the shaft 108 rotates counterclockwise, the yoke nut 148 linearly moves from a first position A to a second position B, and the yoke 142 rotates from a first angular position to a second angular position.

In another example, when the shaft 108 rotates clockwise, the yoke nut 148 linearly moves from the second position B to the first position A, and the yoke 142 rotates from the second angular position to the first angular position. In one example, an angular difference between the first and second angular positions is 90°, but the difference between the angular positions can be more or less than 90°, including, for example, 30°, 45°, and 60°.

In a further example, when the shaft 108 rotates clockwise, the yoke nut 148 linearly moves from first position A to a second position B, and the yoke 142 rotates from a first angular position to a second angular position, and when shaft 108 rotates counterclockwise, the yoke nut 148 moves from the second position B to the first position A, and the yoke 142 rotates from the second angular position to the first angular position.

In one embodiment, when the yoke nut 148 is at the second position B, the valve is closed, and when the yoke nut 148 is at the first position A, the valve is opened. In another embodiment, when the yoke nut 148 is at the first position A, the valve is closed, and when the yoke nut 148 is at the second position B, the valve is opened. Further, when the yoke nut 148 is at an intermediate position between the first and second positions A and B, the valve may be partially opened, intermediately positioned, and/or the like. In one example, first and/or second stoppers may be adjustable to restrict linear displacement of the yoke nut 148 such that the rotation limit of the yoke 142 at either end is adjusted, e.g., between 0-5°.

Referring now to FIGS. 2B, 2C, and 4 together, implementations of the top member 172 of the cover 104 may further include an indicator bore 188 to receive an indicator 190 coupled to the yoke 142. The indicator 190 may be positioned on the top member 172 through the indicator bore 188, and may be operably coupled to the yoke 142 to indicate a current status of the valve, e.g., based on a current angular position of the yoke 142, linear position of the yoke nut 148, and/or the like. The top member 172 may have indication markers 192 that indicate, based on a position of the indicator 190, the current status of the valve, e.g., an open position, a closed position, or an intermediate position of the valve. In one embodiment, the first yoke o-ring 146a is positioned between the yoke 142 and the indicator bore 188 to form a seal between the yoke 142 and the cover 104. In one example, the indicator 190 is made of HDPP.

Referring to FIGS. 2B and 3 together, the valve operator assembly 100 further includes one or more stoppers, e.g., first and second stoppers 158a and 158b insertable into the interior of the housing 101, through first and second stopper bores 160a and 160b at the first and second opposite sides of the sidewall 128, respectively. The first and second stoppers 158a and 158b restrict the linear movement of the yoke nut 148 between the first and second positions A and B, respectively, along the longitudinal axis X.

Further, the first and second stoppers 158a and 158b are insertable through the first and second stopper holes 140a and 140b in the first and second shaft retainers 136a and 136b, respectively. In one embodiment, each of the first and second stoppers 158a and 158b is a screw having an externally threaded portion to engage with an internally threaded portion of respective stopper bore, and is made of metal, for example, stainless steel. In another implementation, the first and second stoppers 158a and 158b have an externally threaded portion to engage with internally threaded portions of respective bores in first and second shaft retainers 136a and 136b, as discussed further below. In some implementations, the position of first and second stoppers 158a and 158b within each of first and second stopper holes 140a and 140b, respectively, may be adjustable so as to allow for adjustment of the rotation limit of yoke 142 by, e.g., 0-5°.

In a scenario, when the first and second stoppers 158a and 158b are absent, the yoke nut 148 may linearly move between the first and second opposite ends of the sidewall 128 and exert pressure on the housing 101, which could place stress on and/or damage the housing, e.g., when the housing is made of lighter material, such as plastic. A stress on the housing 101 may be reduced and/or more efficiently distributed as the first and second stoppers 158a and 158b are utilized to restrict the linear motion of the yoke nut 148 instead of using the sidewall 128 of the housing 101. Thus, a damage to the housing 101 due to the force exerted by the yoke nut 148 may be reduced or avoided by using the first and second stoppers 158a and 158b. Moreover, in embodiments in which the first and second stoppers 158a and 158b are threaded into respective bores in first and second shaft retainers 136a and 136b, as discussed below, the stoppers may couple to the shaft retainers and/or to the shaft 108 itself to restrict linear motion of the yoke nut 148 and protect against damage to the housing that might otherwise be caused by excessive torque applied through the handle 106. With the stoppers mechanically coupled to the shaft retainers and the shaft retainers axially restrained to the shaft, the thrust load of the yoke nut may be applied through the stoppers and shaft retainers to the shaft and not passed through to the housing. Any failure would occur in the shaft itself, which bends or twists under overload conditions.

The first and second stoppers 158a and 158b may have first and second grooves 162a and 162b, respectively, around a circumference thereof, within which first and second stopper o-rings 164a and 164b are coaxially positioned, respectively, to form a seal between the first and second stoppers 158a and 158b and the body 102. In one embodiment, the first and second stopper o-rings 164a and 164b are made of elastomer, for example, FKM, EPDM, BUNA, and/or the like.

Figure 5:
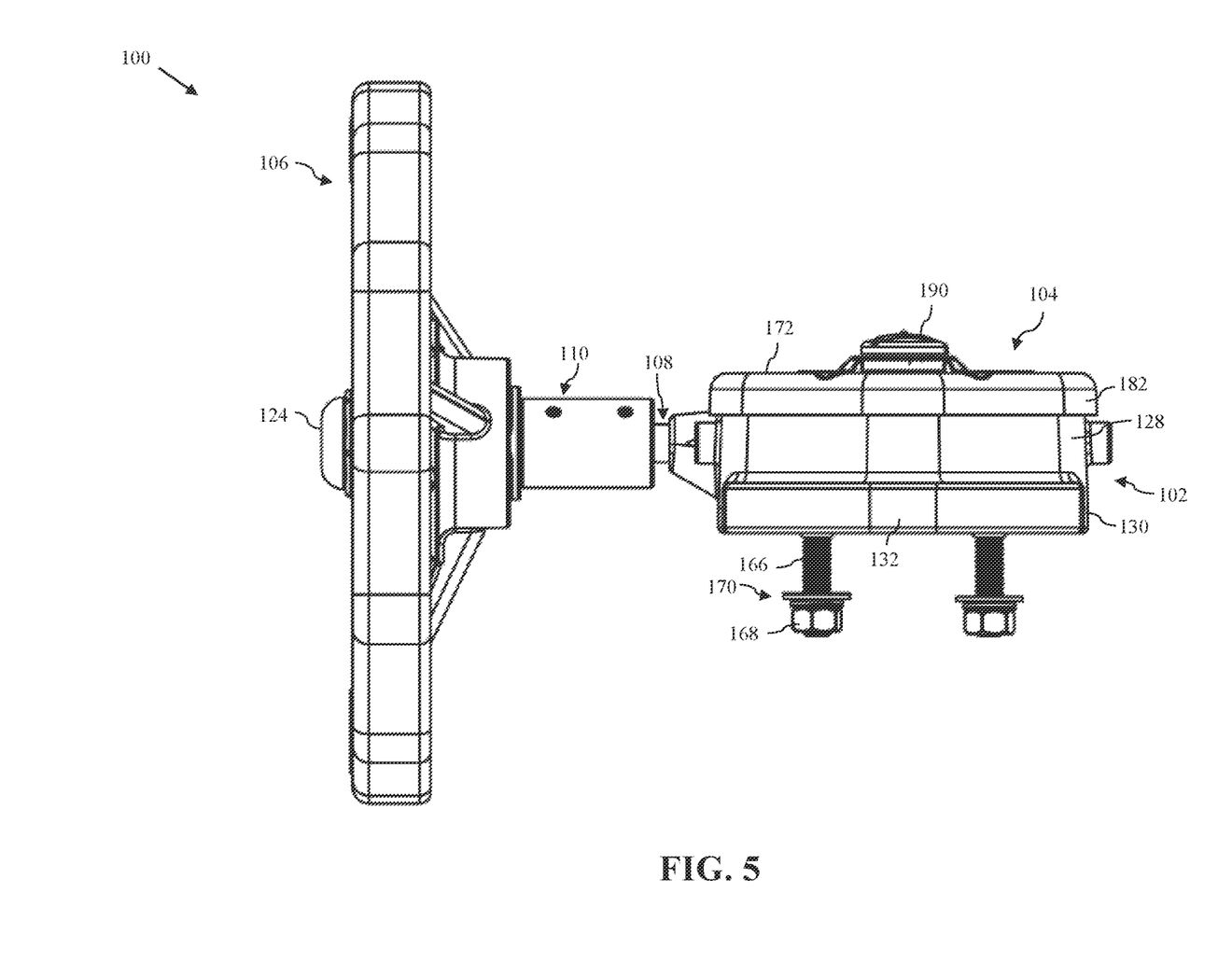
FIG. 5 is a front view of the valve operator assembly of FIG. 1 in accordance with an embodiment of the present disclosure.

FIG. 5 is a front view of the valve operator assembly 100 in accordance with an embodiment of the present disclosure. As shown in FIG. 5, the cover 104 is mounted on the body 102 such that the side portion 182 of the cover 104 at least partially overlaps the sidewall 128 of the body 102, thereby enclosing the body 102 and forming the housing 101. Thus, a structural integrity and strength of the housing 101 may be increased and the housing 101 may be adaptable to handle high pressure, to avoid burst, and/or the like.

Figure 6A:
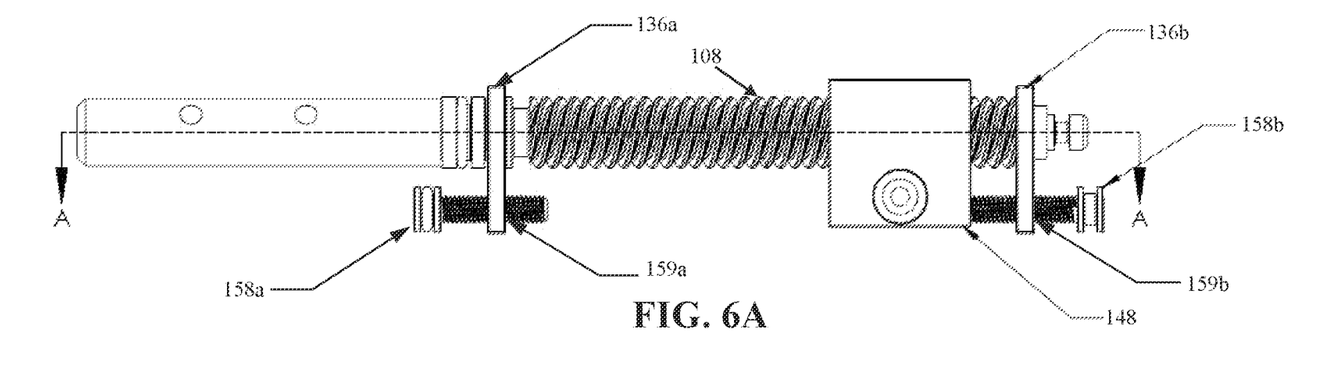
FIG. 6A is a side-view of a valve operator assembly shaft with additional components in accordance with an embodiment of the present disclosure.
Figure 6B:
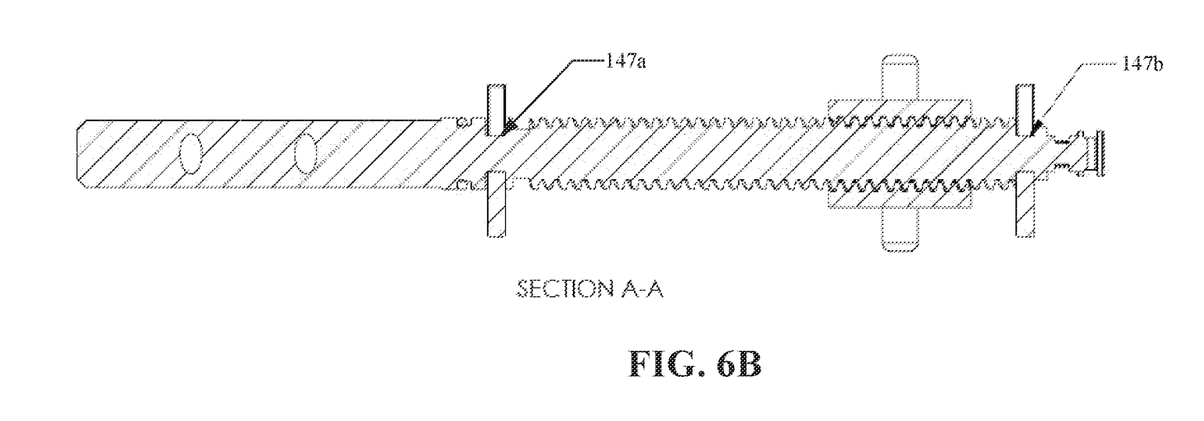
FIG. 6B is a cross-section view of the shaft of FIG. 6A in accordance with an embodiment of the present disclosure.
Figures 7A, 7B:
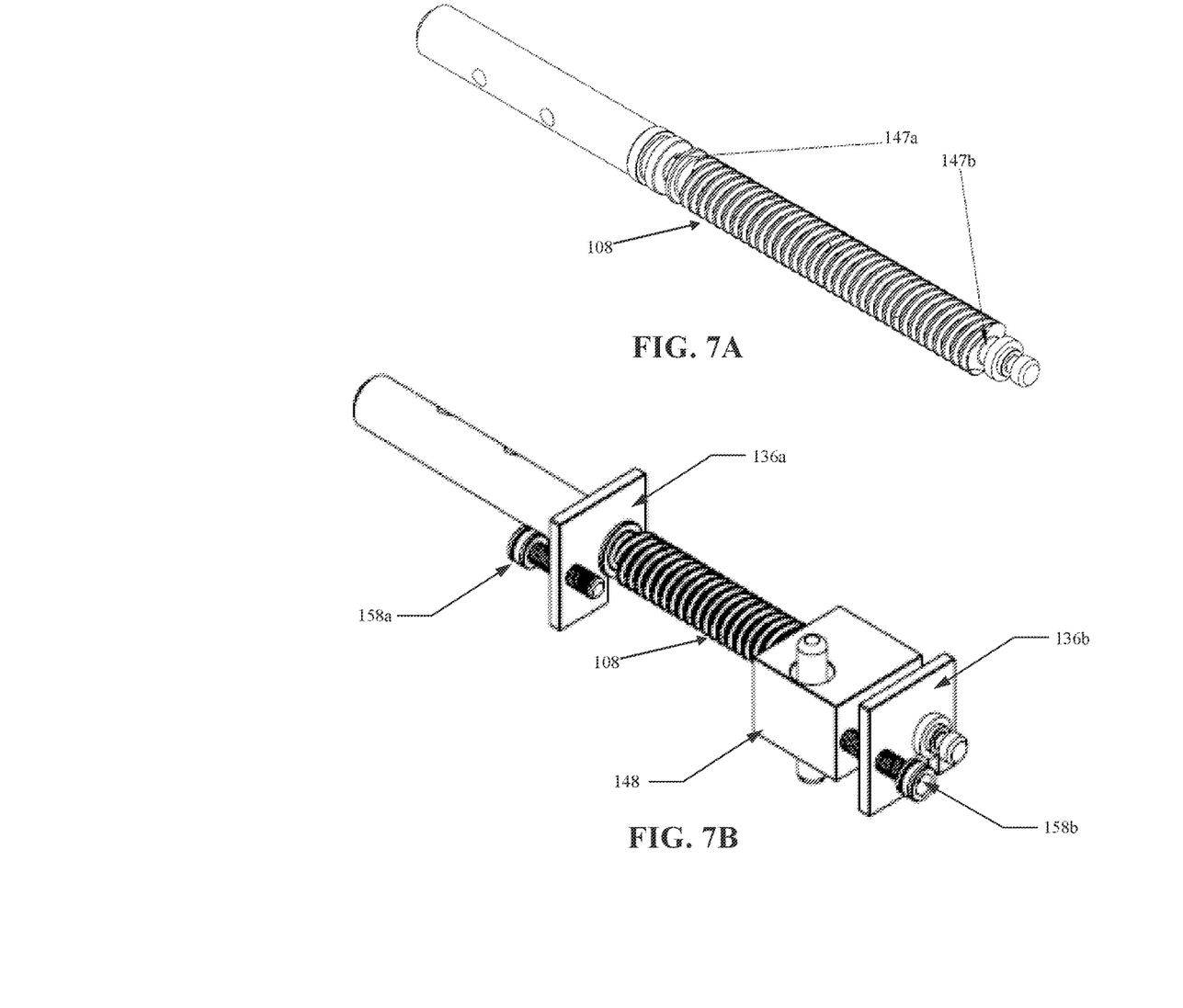
FIG. 7A is a perspective view of the shaft of FIG. 6A in accordance with an embodiment of the present disclosure.
FIG. 7B is a perspective view of the shaft of FIG. 6A with additional components in accordance with an embodiment of the present disclosure.

FIG. 6A is a side-view of a valve operator assembly shaft 108 with additional components in accordance with an embodiment of the present disclosure. In this embodiment, the first and second stoppers 158a and 158b have an externally threaded portion to engage with internally threaded portions of respective bores in first and second shaft retainers 136a and 136b. The shaft retainers, in turn, are mechanically coupled to the shaft 108 via respective shaft retainer grooves 147a and 147b so that the shaft retainers are axially-fixed (i.e., do not move linearly along the axis of shaft 108), as shown in the cross-section view of FIG. 6B. In alternative implementations, the first and second stoppers and/or first and second shaft retainers may be affixed to the shaft, such as being integrally formed or welded, and/or the shaft retainers may be threaded onto the shaft, and/or the like. FIG. 7A shows a perspective view of the shaft 108 of FIG. 6A without the other components, highlighting the positions of the first and second shaft retainer grooves 147a and 147b. The shaft retainer grooves may have a variety of geometries. In some implementations, the shaft retainer grooves may include one or more flat portions to prevent rotation of the shaft retainers about the shaft. FIG. 7B shows a perspective view of the shaft 108 of FIG. 6A with additional components, including the first and second stoppers 158a and 158b, first and second shaft retainers 136a and 136b, and yoke nut 148. In such embodiments, the yoke nut 148 may be restricted in its linear motion along the shaft 108, which can protect against damage (e.g., to the housing) that might otherwise be caused by excessive torque applied through the handle 106. By mechanically coupling the first and second stoppers 158a and 158b to the first and second shaft retainers 136a and 136b and, thereby, to the shaft 108 itself, the thrust load of the yoke nut may be applied to the shaft and not passed through to the housing. Accordingly, any failure, such as may be caused by excessive torque applied to the handle 106, may occur in the shaft itself, which bends or twists under overload conditions.

The utilization of the first and second stoppers 158a and 158b and the partial overlapping between the sidewall 128 and the side portion 182 may present various advantages, e.g., reducing or avoiding material and/or structural failure as a result of high-pressure fluids and/or wear to the housing from operation of the valve operator assembly when using a lighter material, such as plastic material, instead of metal for the body 102 and the cover 104 of the housing 101. Further advantages may include the avoidance of structural failures (e.g., of the housing) caused by excessive torque applied to the handle 106, such as in embodiments in which the first and second stoppers 158a and 158b are affixed to shaft retainers 136a and 136b which are, in turn, stationary with respect to the shaft 108. Additionally, when the body 102 and the cover 104 are made from plastic material, a weight and a cost of the valve operator assembly 100 may be reduced, the body 102 and the cover 104 may be molded into a desired shape, a corrosion resistance of the housing 101 may be improved, and the valve operator assembly may be operational in a submerged environment (e.g., underwater).

Although the disclosure is described herein with reference to specific embodiments, various modifications and changes can be made without departing from the scope of the present disclosure. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or spatial ordering, nor other prioritization of such elements.

Unless otherwise stated, conditional terms such as "can", "could", "will", "might", or "may" are understood within the context as used in general to convey that certain embodiments include, while other embodiments do not include, certain features, elements and/or steps. Thus, such conditional terms are not generally intended to imply that features, elements and/or steps are in any way required for one or more embodiments.

It will be understood by persons of ordinary skill within the art that, terms used herein, are generally intended as "open" terms (e.g., the term "including" should be interpreted as "including but not limited to," the term "having" should be interpreted as "having at least," the term "includes" should be interpreted as "includes but is not limited to," etc.).

The invention claimed is:

1. A valve operator assembly, comprising:
a housing, comprising:
a body having a sidewall including a shaft bore, to receive a shaft along a longitudinal axis of the body such that the shaft is rotatable within the housing, wherein the shaft has a proximal end coupled to an interior wall of the housing and a distal end operably coupled to a handle; and
a cover mountable on a top portion of the body and having a side portion extending downwards so that the side portion is adjacent to the sidewall, to at least partially overlap the sidewall, when the cover is mounted on the body;
a yoke disposed within the housing, attachable to a valve, and operably coupled by a yoke nut to the shaft, wherein the yoke nut is linearly movable upon rotation of the shaft, and wherein the linear motion of the yoke nut produces a rotational motion of the yoke; and
at least one stopper disposed within the housing and positioned to restrict the linear motion of the yoke nut by abutting the yoke nut at an end of the linear motion, wherein the at least one stopper comprises a first stopper insertable into an interior of the housing through at least a first stopper bore and a second stopper insertable into an interior of the housing through a second stopper bore, and
wherein the first and second stopper bores located opposite to each other in the sidewall.

2. The valve operator assembly of claim 1, wherein the body and the cover are made of plastic material, and wherein the plastic material is selected from one of: polyvinyl chloride, chlorinated polyvinyl chloride, polymethyl methacrylate, polycarbonate, polyethylene, polypropylene, polyethylene terephthalate, acrylonitrile-butadiene-styrene, poly vinylidene difluoride, and ethylene chlorotrifluoroethylene.

3. The valve operator assembly of claim 1, wherein the yoke nut has a yoke nut shaft bore to receive the shaft and the yoke and the yoke nut are operably coupled to each other by way of a yoke pin.

4. The valve operator assembly of claim 3, wherein the shaft has a threaded outer surface to engage with a threaded inner surface of the yoke nut shaft bore.

5. The valve operator assembly of claim 1, wherein each of the first and second stopper is a screw having an externally threaded portion to engage with an internally threaded portion of each of the first and second stopper bore, respectively.

6. The valve operator assembly of claim 1, further comprising first and second shaft retainers disposed inside the housing adjacent to first and second opposite sides of the sidewall, respectively, to retain the shaft in a fixed position.

7. The valve operator assembly of claim 1, wherein the handle is operably coupled to the shaft to impart rotation to the shaft, upon rotation of the handle.

8. The valve operator assembly of claim 7, further comprising a handle adapter operably coupled to the shaft by way of one or more handle pins, and operably coupled to the handle by way of an adapter nut.

9. The valve operator assembly of claim 7, wherein the handle is a handwheel.

10. The valve operator assembly of claim 1, wherein the housing is mountable on the valve by way of a plurality of mounting bolts and the yoke is attachable to a valve stem of the valve.

11. The valve operator assembly of claim 1, further comprising an indicator positioned on the cover, and operably coupled to the yoke to indicate a current status of the valve based on a current angular position of the yoke.

12. The valve operator assembly of claim 1, wherein the first stopper and second stopper are collinear.

13. A valve operator assembly, comprising:
a housing, comprising:
a body having a sidewall including a shaft bore, to receive a shaft along a longitudinal axis of the body such that the shaft is rotatable within the housing, wherein the shaft has a proximal end coupled to an interior wall of the housing and a distal end operably coupled to a handle; and
a cover mountable on a top portion of the body and having a side portion extending downwards so that the side portion is adjacent to the sidewall, to at least partially overlap the sidewall, when the cover is mounted on the body, wherein the body and the cover are made of plastic material;
a yoke disposed within the housing, attachable to a valve, and operably coupled by a yoke nut to the shaft, wherein the yoke nut is linearly movable upon rotation of the shaft, and wherein the linear motion of the yoke nut produces a rotational motion of the yoke; and
at least one stopper disposed within the housing and positioned to restrict the linear motion of the yoke nut by abutting the yoke nut at an end of the linear motion, wherein the at least one stopper comprises a first stopper insertable into an interior of the housing through at least a first stopper bore and a second stopper insertable into an interior of the housing through a second stopper bore, and
wherein the first and second stopper bores located opposite to each other in the sidewall.

14. The valve operator assembly of claim 13, wherein the plastic material is selected from one of: polyvinyl chloride, chlorinated polyvinyl chloride, polymethyl methacrylate, polycarbonate, polyethylene, polypropylene, polyethylene terephthalate, acrylonitrile-butadiene-styrene, poly vinylidene difluoride, and ethylene chlorotrifluoroethylene.

15. The valve operator assembly of claim 13, wherein the yoke nut has a yoke nut shaft bore to receive the shaft and the yoke and the yoke nut are operably coupled to each other by way of a yoke pin.

16. The valve operator assembly of claim 13, wherein each of the first and second stopper is a screw having an externally threaded portion to engage with an internally threaded portion of each of the first and second stopper bore, respectively.

17. The valve operator assembly of claim 13, wherein the handle is operably coupled to the shaft to impart rotation to the shaft, upon rotation of the handle.

18. A valve operator assembly, comprising:
a housing mountable on a valve, and comprising:
a body having a sidewall including first and second shaft bores at first and second opposite sides, respectively, to receive a shaft along a longitudinal axis of the body such that the shaft is rotatable within the housing; and
a cover mountable on a top portion of the body and a side portion extending downwards so that the side portion is adjacent to the sidewall, to at least partially overlap the sidewall, wherein the body and the cover are made of plastic material;
a yoke disposed within the housing, attachable to a valve stem of the valve, and operably coupled by a yoke nut to the shaft to impart rotation to the valve stem when the shaft is rotated, wherein the yoke nut has a third shaft bore to receive the shaft, and is linearly movable upon rotation of the shaft such that the linear motion of the yoke nut produces a rotational motion of the yoke, and wherein the yoke and the yoke nut are operably coupled to each other by way of a yoke pin; and
first and second stoppers disposed within the housing and positioned to restrict the linear motion of the yoke nut by abutting the yoke nut at respective first and second ends of the linear motion,
wherein the first stopper is insertable into an interior of the housing through at least a first stopper bore, the second stopper is insertable into an interior of the housing through a second stopper bore, and the first and second stopper bores are located opposite to each other in the sidewall.

19. The valve operator assembly of claim 18, further comprising a handle operably coupled to the shaft to impart rotation to the shaft, upon rotation of the handle.

20. A valve operator assembly comprising:
a shaft having a threaded outer surface;
a handle operably coupled to the shaft to impart rotation to the shaft upon rotation of the handle;
a yoke attachable to a valve and operably coupled by a yoke nut to the shaft, wherein the yoke nut has a threaded inner surface to engage with the threaded outer surface of the shaft;
first and second shaft retainers mechanically coupled to the shaft in respective first and second axially-fixed positions, wherein each of the first and second shaft retainers include respective first and second shaft bores having an internally threaded bore surface; and
first and second stoppers comprising screws with externally threaded stopper surfaces to engage with the internally threaded bore surfaces of the first and second shaft bores, respectively,
wherein the first and second stoppers are positioned to restrict linear motion of the yoke nut between the first and second axially-fixed positions of the first and second shaft retainers by abutting the yoke nut at respective first and second ends of the linear motion.

\* \* \* \* \*